United States Patent [19]

Korf

[11] 4,267,277

[45] May 12, 1981

[54] METHOD OF PRODUCING UREA-FORMALDEHYDE RESIN AND FOAM HAVING REDUCED FORMALDEHYDE EMISSION

[75] Inventor: Heinz L. Korf, Montreal, Canada

[73] Assignee: Rapco Foam, Inc., New York, N.Y.

[21] Appl. No.: 110,083

[22] Filed: Jan. 7, 1980

[51] Int. Cl.$^3$ .............................................. C08J 9/30
[52] U.S. Cl. .................................... 521/103; 521/187; 521/188; 528/239; 528/240
[58] Field of Search ................ 528/239, 240; 521/187, 521/188, 103

[56] References Cited

U.S. PATENT DOCUMENTS

| | | | |
|---|---|---|---|
| 3,231,525 | 1/1966 | Kelly et al. ......................... | 521/188 |
| 3,979,341 | 9/1976 | Widman ............................... | 521/116 |
| 4,016,111 | 4/1977 | Wolff et al. ......................... | 521/188 |
| 4,129,533 | 12/1978 | Moore, Jr. .......................... | 521/188 |

*Primary Examiner*—Morton Foelak
*Attorney, Agent, or Firm*—Seed, Berry, Vernon & Baynham

[57] ABSTRACT

A method for producing stable urea-formaldehyde polymers which have reduced aldehyde vapor emissions during their production and use is disclosed, such urea-formaldehyde polymers particularly useful in the production of urea-formaldehyde insulating foam and as adhesives in the production of plywood and particleboard. An alkali or alkaline earth metal borohydride is added to the urea-formaldehyde resin solution prior to or during cure thereof. The boroydride reacts with free formaldehyde in the resin solution or any free formaldehyde subsequently generated in the resin due to hydrolytic break down. The amount of borohydride added the resin solution should be sufficient to reduce the emission of free formaldehyde therefrom.

2 Claims, No Drawings

METHOD OF PRODUCING UREA-FORMALDEHYDE RESIN AND FOAM HAVING REDUCED FORMALDEHYDE EMISSION

BACKGROUND OF THE INVENTION

1. Field of the Invention

This invention relates to the method of making urea-formaldehyde polymers which have reduced aldehyde vapor emissions, to a method of making a cellular urea-formaldehyde foam with reduced aldehyde emissions and to a urea-formaldehyde foam having reduced aldehyde emissions.

2. Prior Art Relating to the Disclosure

The emission of formaldehyde vapor from particleboard, plywood and insulating foams and other such materials made with or incorporating urea-formaldehyde resins, is and continues to be a problem. Numerous methods have been proposed to reduce the free formaldehyde content of urea-formaldehyde resins. U.S. Pat. No. 4,129,533 discloses substitution for 20 percent of the total aldehyde moieties of the urea-formaldehyde resin, one or more aryl dialdehydes having two to eight carbon atoms, the dialdehydes provided as a cross-linking solution at the time of final polymer formation. The patent also mentions the use of large amounts of calcium lignosulfonates and mineral oil containing sodium silicate for reducing the aldehyde emission of urea-formaldehyde resins. U.S. Pat. No. 3,979,341 discloses the use of furfuryl alcohol and resorcinol to reduce formaldehyde odor in urea-formaldehyde foams. U.S. Pat. No. 3,231,525 discloses preparation of urea-formaldehyde foams in which the formaldehyde odor is substantially suppressed or eliminated by adding free urea to the hardner solution during manufacture of the foam.

SUMMARY OF THE INVENTION

It is a primary object of this invention to provide a process of making urea-formaldehyde polymers having reduced formaldehyde emission by incorporating in the urea-formaldehyde, an alkali or alkaline earth metal borohydride.

It is a further object of this invention to provide a urea-formaldehyde insulating foam having reduced formaldehyde emissions by incorporating into the resin solution at the time of foaming or prior thereto an alkali or alkaline earth metal borohydride in sufficient amounts to eliminate formaldehyde odor.

These and other objects are accomplished by incorporating an alkali or alkaline earth metal borohydride in the resin solution prior to the final gelation or hardening.

DESCRIPTION OF THE PREFERRED EMBODIMENTS

Urea-formaldehyde resin are commonly encountered in particleboard, interior plywood and urea-formaldehyde foams which have found broad acceptance in Europe and the United States as excellent insulation in both home and industrial applications. Urea-formaldehyde resins used in the manufacture of urea-formaldehyde foams are generally formulated to produce a rapidly setting, low density foam having a low shrinkage. Such foams are made by mixing together two main components with aeration, the components including (1) an aqueous solution of urea-formaldehyde resin and (2) an aqueous solution of a surfactant and a strong acid curing agent or catalyst. Resin foams prepared, as previously stated, are injected into the walls of dwelling units with a specially designed gun where they finally cure in place. The resins rapidly gel to produce a highly cross-linked and in soluble polymer when placed in contact with an acidic curing agent. The formation of the polymer network is a result of the high functionality of urea, whose four amide hydrogen atoms react with the hydroxyl groups of methylene glycol, the hydrate of formaldehyde existing in an aqueous solution thereof. Typically, the urea-formaldehyde resin has a molar ratio of urea to formaldehyde from 1.0 to 2.0, preferably 1.3 to 1.6. There is generally some unreacted monomer in the final cured urea-formaldehyde resin, this monomer present as free formaldehyde or an N-methylol moiety at the polymer chain ends. During the varying conditions of temperature and humidity in which the foam is exposed to when used in insulation purposes in dwelling units, the free formaldehyde is emitted as a vapor and can cause objectionable odors.

It was suprising that the addition of an alkali or alkaline earth metal borohydride to a partially gelled urea-formaldehyde resin, resulted in a product with substantially reduced or eliminated formaldehyde emissions.

The amount of borohydride added to the resin solution should be sufficient to reduce or eliminate the free aldehyde content of the resin. In general 0.2 to 2.0 mole of borohydride per mole formaldehyde should be used, preferably about 0.25 mole. The borohydride apparently reduces or eliminates the free formaldehyde in the resin solution by reaction therewith to form methanol.

The pH of the resin solution to which the borohydride is added should arrange preferably be 7.0 or greater, preferably about pH 8.0

EXAMPLE 1

An aqeueous urea-formaldehyde resin solution was obtained from Rapco Foam Inc. of Costa Mesa, California. The resin solution had a mole ratio of urea to formaldehyde of about 1.0:1.65 and a viscosity of 40±5 as measured by a No. 4 cup. The resin solution was buffered to pH 8 before addition to the resin solution of 1 mole of sodium borohydride per 4 moles formaldehyde. The resin solution with the added sodium borohydride was foamed using an Isoschaum foaming gun and a foaming agent which contained a strong acid, a surfactant and water. The foaming agent solution was introduced into the foaming chamber of the gun where it was mixed with pressurized air. The resulting froth was conveyed to a mixing chamber, where it was mixed with the resin solution. The fluid foam obtained was poured into an open, rectangular mold and permitted to dry to constant weight. After two weeks, the amount of formaldehyde emitted from the foam was tested for formaldehyde emission by a conventional test method employing Draeger tubes. The free formaldehyde noted was about 0.05 ppm. The same foam was tested after 1 month, 2 months, 3 months and 4 months by the same procedure as above. No free formaldehyde was found.

It also appeared that the hydrolysis resistance of the foam was improved. After 2 months, a 2.0 gm. sample of the foam, prepared as previously stated, was pulverized, mixed with 250 cc water, filtered, and the pH of the filtrate determined. The pH was about 6.5 in contrast to that which would be expected in a conventional foamed urea-formaldehyde without borohydride, i.e. a pH of 3.5 to 4.5.

I claim:

1. A method of producing a cellular foam having reduced aldehyde vapor emission during use thereof, comprising:

dispensing a foaming gas into an aqueous resin solution of a condensation product of urea and formaldehyde, the aqueous resin containing an aqueous surfactant foaming agent, an acid curing catalyst and a sufficient amount of an alkali or alkaline earth metal borohydride to reduce any free formaldehyde emitted from the foam.

2. The method of claim 1, wherein the molar ratio of urea to formaldehyde ranges from 1.0:1 to 2.0:1.

* * * * *